United States Patent
Buerge et al.

(10) Patent No.: US 8,092,592 B2
(45) Date of Patent: Jan. 10, 2012

(54) ADDITIVE FOR HYDRAULIC BINDING AGENT WITH LONG PROCESSING TIME AND HIGH EARLY STRENGTH

(75) Inventors: Christian Buerge, Schafisheim (CH); Franz Wombacher, Jonen (CH); Andre Peter, Effretikon (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 12/955,414

(22) Filed: Nov. 29, 2010

(65) Prior Publication Data

US 2011/0067604 A1  Mar. 24, 2011

Related U.S. Application Data

(63) Continuation of application No. PCT/EP2009/056586, filed on May 29, 2009.

(30) Foreign Application Priority Data

May 29, 2008  (EP) .................................. 08157144

(51) Int. Cl.
| | |
|---|---|
| C04B 24/00 | (2006.01) |
| C04B 24/04 | (2006.01) |
| C04B 103/00 | (2006.01) |
| C04B 103/12 | (2006.01) |
| C04B 103/14 | (2006.01) |

(52) U.S. Cl. ........ 106/806; 106/717; 106/724; 106/728; 106/802; 106/810; 106/823

(58) Field of Classification Search .................. 106/728, 106/810, 823, 717, 724, 802, 806
See application file for complete search history.

(56) References Cited

U.S. PATENT DOCUMENTS

| | | | |
|---|---|---|---|
| 2,492,790 A | | 12/1949 | Farkas et al. |
| 3,537,869 A | * | 11/1970 | Proell .......................... 106/665 |
| 4,542,172 A | * | 9/1985 | Jochum et al. ................ 523/116 |
| 6,302,954 B1 | | 10/2001 | Lunkenheimer et al. |
| 2006/0004148 A1 | | 1/2006 | Sulser et al. |
| 2008/0119602 A1 | | 5/2008 | Sulser et al. |

FOREIGN PATENT DOCUMENTS

| | | |
|---|---|---|
| DE | 3140808 A1 | 4/1983 |
| EP | 0056627 B1 | 10/1984 |
| EP | 0076927 B1 | 7/1985 |
| EP | 1136508 A1 | 9/2001 |
| EP | 1348729 A1 | 10/2003 |
| EP | 1138697 B1 | 11/2003 |
| EP | 0840712 B1 | 3/2004 |
| EP | 0946451 B2 | 10/2005 |
| JP | 52-071819 A * | 6/1977 |
| JP | 54-153829 A * | 12/1979 |
| JP | 57-022162 A * | 2/1982 |
| JP | 61-023683 A * | 2/1986 |
| JP | 07-268387 A * | 10/1995 |
| WO | WO 97/49646 A1 | 12/1997 |
| WO | WO 00/23396 A * | 4/2000 |
| WO | WO 2005/044898 A1 | 5/2005 |

OTHER PUBLICATIONS

Derwent Abstract No. 2008-L32333, abstract of Chinese Patent Specification No. CN 101125219 A (Feb. 2008).*
International Search Report (PCT/ISA/210) issued on Sep. 3, 2009, by European Patent Office as the International Searching Authority for International Application No. PCT/EP2009/056586.
Written Opinion (PCT/ISA/237) issued on Sep. 3, 2009, by European Patent Office as the International Searching Authority for International Application No. PCT/EP2009/056586.
Notification of Transmittal of Translation of the International Preliminary Report on Patentability (Forms PCT/IB/338 and PCT/IB/373) and the Written Opinion of the Searching Authority ( Form PCT/ISA/237) issued in the corresponding International Application No. PCT/EP2009/056586 dated Dec. 16, 2010.

* cited by examiner

*Primary Examiner* — Anthony Green
(74) *Attorney, Agent, or Firm* — Buchanan Ingersoll & Rooney PC

(57) ABSTRACT

Exemplary embodiments as disclosed herein are directed to setting and curing accelerators for hydraulic binders, including at least one ester of a polyhydric alcohol with an acid and/or salts thereof, where the acid is a phosphoric acid, phosphorous acid or a $C_2$ to $C_{20}$ carboxylic acid. Compositions including at least one accelerator as disclosed herein can accelerate the setting and curing of hydraulic binders and mortar or concrete produced therefrom, such as quick-setting cement. Methods for accelerating the setting and curing of hydraulic binders and mortar or concrete produced therefrom are also disclosed.

12 Claims, No Drawings

ADDITIVE FOR HYDRAULIC BINDING AGENT WITH LONG PROCESSING TIME AND HIGH EARLY STRENGTH

RELATED APPLICATIONS

This application claims priority as a continuation application under 35 U.S.C. §120 to PCT/EP09/056,586, which was filed as an International Application on May 29, 2009 designating the U.S., and which claims priority to European Application 08157144.0 filed in Europe on May 29, 2008. The entire contents of these applications are hereby incorporated by reference in their entireties.

FIELD

The present disclosure relates to admixtures for hydraulic binders and to systems produced therefrom, such as concrete and mortar.

BACKGROUND INFORMATION

In precast concrete or reinforced concrete components, or in road surface or runway renewals, there are increasing demands for a high early strength, in order that the precast components can be demolded, transported, stacked or prestressed after only a few hours, or the road surfaces or runways can be traveled upon. In order to achieve this in practice, high-performance concrete formulations, such as low w/c ratio or high cement content, are employed, as are heat or steam treatments. These treatments involve a great deal of energy, and so this treatment is increasingly being abandoned owing to rising energy costs, considerable capital costs and problems with durability and exposed concrete, and other ways of accelerating the curing process are being sought.

Accelerating additives have to date not constituted a satisfactory alternative to heat or steam treatment. There are many known substances which accelerate the setting and curing of concrete. Examples in use are strongly alkaline substances such as alkali metal hydroxides, alkali metal carbonates, alkali metal silicates, alkali metal aluminates and alkaline earth metal chlorides. In the case of the strongly alkaline substances, however, undesired hazards for the user, such as chemical burns, can occur, and they reduce the final strength and the durability of the concrete.

EP 0076927 B1 and EP 0 946 451 B1 disclose alkali-free solidification accelerators for hydraulic binders. To accelerate the solidification and curing of a hydraulic binder, such as cement, lime, hydraulic lime and gypsum, and mortar and concrete produced therefrom, an alkali-free solidification and curing accelerator is added, the accelerator including aluminum hydroxide and optionally aluminum salts and organic carboxylic acids.

Although such known accelerators accelerate the setting and curing of hydraulically setting systems, they are expensive, the use thereof can be restricted owing to inadequate durability and insufficient efficacy, and they reduce the processing time but have an adverse effect on the final strengths of the concrete. Such setting and curing accelerators are additionally a relatively low early strength in the first hours and days, and possess inadequate solution stability.

The systems known at present, where the hydration of a concrete is accelerated by the addition of a setting accelerator, mostly relate to spray concrete. With known methods of controlling hydration, the cement mixtures set very rapidly after addition of the accelerator. This can be desirable, especially in the case of use as spray concrete. However, such known systems are unsuitable when the cement mixture has to be processed further after activation or when the processed concrete has to be stressed after a short time. In the case of the known systems for spray concrete application, however, there is no further processability after activation.

The present disclosure is directed to an admixture which can accelerate the setting and curing process of compositions containing hydraulic binders, which not only enables use in spray concrete, but with which it is possible to produce a quick-curing mortar or concrete composition which has a high early strength and good processing properties, and thus enables early demolding or early stress.

SUMMARY

A setting and curing accelerator is disclosed for hydraulic binders, comprising: at least one ester of a polyhydric alcohol with an acid and/or salts thereof, where the acid is a phosphoric acid, phosphorous acid or a $C_2$ to $C_{20}$ carboxylic acid.

An admixture is disclosed for hydraulically setting systems, comprising: at least one accelerator; and at least one plasticizer, wherein the accelerator includes at least one ester of a polyhydric alcohol with an acid and/or salts thereof, where the acid is a phosphoric acid, phosphorous acid or a $C_2$ to $C_{20}$ carboxylic acid.

A binder-containing mixture is disclosed, comprising: at least one hydraulically setting binder; and at least one accelerator in an amount of 0.001 to 10% by weight based on a weight of the hydraulically setting binder, wherein the accelerator includes at least one ester of a polyhydric alcohol with an acid and/or salts thereof, where the acid is a phosphoric acid, phosphorous acid or a $C_2$ to $C_{20}$ carboxylic acid.

A process for producing a binder-containing mixture is disclosed comprising: adding an accelerator as an admixture in solid or liquid form with a hydraulically setting binder, the accelerator including at least one ester of a polyhydric alcohol with an acid and/or salts thereof, where the acid is a phosphoric acid, phosphorous acid or a $C_2$ to $C_{20}$ carboxylic acid.

A method is disclosed for accelerating the setting and curing of a hydraulic binder and mortar or concrete produced therefrom, comprising: adding a setting and curing accelerator in an amount of 0.001 to 10% by weight based on a weight of the hydraulic binder, to a mixture which comprises the hydraulic binder, wherein the accelerator includes at least one ester of a polyhydric alcohol with an acid and/or salts thereof, where the acid is a phosphoric acid, phosphorous acid or a $C_2$ to $C_{20}$ carboxylic acid.

DETAILED DESCRIPTION

Exemplary embodiments as disclosed herein are directed to setting and curing accelerators for hydraulic binders, comprising at least one ester of a polyhydric alcohol with an acid and/or salts thereof, where the acid is a phosphoric acid, phosphorous acid or a $C_2$ to $C_{20}$ carboxylic acid. Compositions comprising or consisting of at least one accelerator as disclosed herein can accelerate the setting and curing of hydraulic binders and mortar or concrete produced therefrom, such as quick-setting cement. Methods for accelerating the setting and curing of hydraulic binders and mortar or concrete produced therefrom are also disclosed.

Setting and curing accelerators or admixtures as disclosed herein can accelerate the setting on the one hand but, on the other hand, enable further processability of the cement or concrete mixture for a certain time after addition to a cement or concrete mixture. Exemplary embodiments can achieve a maximum early strength with the accelerator or the admixture.

As disclosed herein, a hydraulically setting composition, for example a cement or concrete mixture, remains processable after admixture with an accelerator as disclosed herein. The activation can cause a significant acceleration of setting, which, in contrast to unactivated concrete, leads to vastly earlier strengths and, for example, also enables earlier demolding or stress. After the activation of the concrete, however, processability is maintained completely for a desired period.

An exemplary setting and curing accelerator for hydraulic binders is disclosed which includes at least one ester of a polyhydric alcohol with an acid and/or salts thereof, where the acid is a phosphoric acid, phosphorous acid or a $C_2$ to $C_{20}$ carboxylic acid.

The ester can be obtained by esterification from a polyhydric alcohol with an acid or salt thereof. The ester is, for example, a partial ester of a polyhydric alcohol, preferably of a di- or trihydric alcohol. The expression "partial ester of a polyhydric alcohol" is understood to mean that the polyhydric alcohol, as well as one or more ester bonds, also has one or more free hydroxyl groups. The ester may be a mono-, di- or triester. A particularly preferred ester is, for example, the monoester, preferably a monoester of a di- or trihydric alcohol.

The expression "polyhydric alcohol" is understood to mean an alcohol having more than one hydroxyl group, for example having two, three, four or five hydroxyl groups. Exemplary preference is given to an alcohol having two or three hydroxyl groups, i.e. a di- or trihydric alcohol. Suitable alcohols are, for example, polyhydric alkyl alcohols such as propanediol, butanediol, or glycerol, diglycerol, polyglycerol, trimethylolethane, trimethylolpropane, 1,3,5-pentanetriol, erythritol, pentaerythritol, dipentaerythritol, sorbitol, sorbitan or isosorbide. Exemplary preference is given to glycerol or propanediol, especially glycerol.

An exemplary preferred acid or salt thereof for preparation of the ester is especially phosphoric acid or a salt thereof. Likewise suitable is phosphorous acid or a $C_2$ to $C_{20}$ carboxylic acid. A useful carboxylic acid is especially a monocarboxylic acid, preferably a $C_4$ to $C_{20}$ monocarboxylic acid, especially preferably a fatty acid. Particularly good results can be achieved with, for example, an unsaturated acid, especially oleic acid.

The acid may be in the form of a free acid or else in the form of a salt or partial salt, the term "salt" here and hereinafter comprising not only the known salts as obtained by neutralization with a base but also complexes between metal ions and the carboxylate or carboxyl groups as ligands.

All or some of the free acid groups of the ester can be neutralized, the salt being an alkali metal or alkaline earth metal salt, i.e. a salt of mono- or polyvalent cations, such as a sodium, potassium, calcium, magnesium, zinc or aluminum salt, preferably a sodium or aluminum salt.

Suitable setting and curing accelerators are, for example, esters, especially monoesters, selected from the group consisting of glyceryl phosphate, glyceryl butyrate, glyceryl octanoate, glyceryl decanoate, glyceryl laurate, glyceryl myristate, glyceryl palmitate, glyceryl stearate or glyceryl oleate. Particular preference is given to glyceryl monooleate or glyceryl monophosphate. An exemplary preferred accelerator is glyceryl 2-phosphate or glyceryl 3-phosphate.

The setting and curing accelerators as disclosed herein can find use in different sectors, such as in concrete and cement technology. The exemplary accelerator possesses particularly good properties as an accelerator for hydraulically setting compositions; e.g., it can be used for accelerating the setting and curing of hydraulic binders, especially of quick-setting cement, and mortar or concrete produced therefrom. In addition, an exemplary accelerator disclosed herein can be used to produce mortar or concrete which has a high early and final strength. The setting and curing accelerator is thus particularly suitable when it is desired for the hydraulically setting composition to be stressed or walked upon very rapidly after application, for example in road or bridge building, in the prefabrication of concrete elements in precast concrete and reinforced concrete components, or in runway renewals, especially in the case of airstrips, in order that the precast components can be demolded, transported, stacked or prestressed after only a few hours, or the road surfaces or runways can be traveled upon. Surprisingly, the setting and curing accelerator disclosed herein can have a particularly rapid accelerator compared to known accelerators. In addition, accelerators disclosed can have no adverse effect on the processing time or on the final strength of the mortar or concrete produced therewith.

The hydraulically setting systems or compositions used may in principle be any hydraulically setting substances known to the person skilled in the art of concrete. For example, these are hydraulic binders such as cements, for example portland cements or high-alumina cements and the respective mixtures thereof with fly ash, fumed silica, slag, slag sand and limestone filler. A further hydraulically setting substance in the context of the present disclosure is quicklime. An exemplary preferred hydraulically setting composition is cement. In addition, aggregates such as sand, gravel, stones, quartz flour, chalk are possible, and also, as additives, customary constituents such as other concrete plasticizers, for example lignosulfonates, sulfonated naphthalene-formaldehyde condensates, sulfonated melamine-formaldehyde condensates or polycarboxylate ethers, accelerators, corrosion inhibitors, retardants, shrinkage reducers, defoamers or pore formers.

An exemplary accelerator can be used in a manner as disclosed herein either in liquid or in solid form, either alone or as a constituent of an admixture. The disclosure therefore additionally relates to an admixture in liquid or solid form, comprising at least one accelerator as disclosed herein.

In order to improve processability and to prolong the processing time after addition of the disclosed accelerators to a hydraulic binder, the admixture comprises, for example, a plasticizer in addition to the accelerator. Useful exemplary plasticizers include, for example, lignosulfonates, sulfonated naphthalene-formaldehyde condensates, sulfonated melamine-formaldehyde condensates, sulfonated vinyl copolymers or polycarboxylate plasticizers, as known, for example, as high-performance plasticizers in the concrete industry, or mixtures thereof. Exemplary preference is given especially to polycarboxylate plasticizers as described, for example, in EP 0 056 627 B1, EP 0 840 712 B1, EP 1 136 508 A1, EP 1 138 697 B1 or EP 1 348 729 A1. Particular preference is given to plasticizers which have been prepared by the polymer-analogous reaction as described, for example, in EP 1 138 697 B1 or EP 1 348 729 A1.

The accelerator or the admixture comprising the accelerator may also comprise further constituents. Examples of further constituents are solvents, especially water, or additives, such as further accelerating substances, for example thiocyanates, nitrates or aluminum salts, acids or salts thereof, or amine-containing substances such as alkanolamines, retardants, shrinkage reducers, defoamers or foam formers.

If the exemplary accelerator disclosed herein or the admixture comprising the accelerator can be used in liquid form, and exemplary preference is given to using a solvent for the reaction. Preferred solvents are, for example, hexane, toluene, xylene, methylcyclohexane, cyclohexane or dioxane, and also alcohols, especially ethanol or isopropanol, and water, water being the most preferred solvent.

The exemplary accelerator or the admixture comprising the accelerators may also be present in the solid state, for example in the form of powder, flakes, pellets, granules or slabs, and can be transported and stored in this form without any problem.

The exemplary accelerator may be present, for example, in the solid state and may be mixed with a plasticizer which is likewise in the solid state, and can be stored or transported in this form over a prolonged period. However, the accelerator can also be mixed with a liquid plasticizer and be used in the form of a liquid admixture. The liquid admixture can also subsequently be converted back to the solid state, for example to powder form, for example by spray drying, with the aid of protective colloids or other drying aids.

The exemplary accelerator or the admixture comprising the accelerator may, in the solid state, also be part of a cement composition, a so-called dry mix, which is storable over a prolonged period and can be packaged into bags or stored in silos and used.

The exemplary accelerator or the admixture comprising the accelerator can also be added to a customary concrete composition with or shortly before or shortly after the addition of the water. It has been found to be particularly suitable here to add the accelerator in the form of an aqueous solution or dispersion, especially as mixing water or as part of the mixing water or as part of a liquid admixture which is added to the hydraulic binder with the mixing water.

The exemplary accelerator or the admixture can also be sprayed in liquid form onto the binder, the concrete, mortar and nonhydraulic admixtures before or after the grinding of the hydraulic or latently hydraulic binder. For example, the hydraulic binder may be partly coated with the accelerator or the admixture comprising the accelerator. This enables the production of a hydraulic binder, such as cement or latently hydraulic slag, which already comprises the accelerator or the admixture comprising the accelerator and can thus be stored and sold as a finished mixture, for example as so-called quick-setting cement. After addition of the mixing water, this cement has the desired properties of quick setting and of high early strength without any need to add a further admixture additionally to the mixing water on the building site.

In a further aspect, the present disclosure relates to a binder-containing mixture comprising at least one hydraulically setting binder and at least one setting and curing accelerator as disclosed herein. Useful binders include, for example, cement, especially portland cement or high-alumina cement and the respective mixtures thereof with fly ash, fumed silica, slag, slag sand, gypsum and limestone filler or quicklime, a latently hydraulic powder or inert microscopic powder. Useful binder-containing mixtures are for example concrete compositions.

In addition, the mixture may comprise further aggregates such as sand, gravel, stones, quartz flour, chalk, and also, as additives, customary constituents such as concrete plasticizers, for example lignosulfonates, sulfonated naphthalene-formaldehyde condensates, sulfonated melamine-formaldehyde condensates or polycarboxylate ethers (PCE), accelerators, corrosion inhibitors, retardants, shrinkage reducers, defoamers or foam formers.

For example, the binder-containing mixture comprises, in addition to the accelerator, at least one plasticizer, preferably a plasticizer based on polycarboxylate ether (PCE).

The exemplary accelerator can be preferably used in an amount of 0.001 to 10% by weight based on the weight of the binder, in order to achieve the desired effect. It is also possible to use a plurality of accelerators in a mixture in order to achieve the desired effect.

In a further aspect, the present disclosure relates to a process for producing a binder-containing mixture, wherein the at least one accelerator is added to the binder separately or premixed as an admixture, in solid or liquid form.

In a further aspect, the present disclosure relates to a process for accelerating the setting and curing of hydraulic binders and mortar or concrete produced therefrom, wherein a setting and curing accelerator as disclosed herein is added in an amount of 0.001 to 10% by weight, for example 0.01 to 1% by weight and especially preferably 0.01 to 0.1% by weight to a mixture which comprises a hydraulic binder, based on the weight of the cement. When an admixture comprising the accelerator and, for example, additionally at least one plasticizer is added to a hydraulic binder, the amount of the overall admixture added is 0.01 to 10% by weight, for example 0.1 to 10% by weight and even more preferably 1 to 5% by weight, based on the weight of the hydraulic binder.

The present disclosure provides an admixture for hydraulic binders, which accelerates the setting and curing process of the hydraulic binders without having an adverse effect on the processing times, the evolution of strength or the durability of the mortar or concrete compositions produced therewith. The admixture and especially the setting and curing accelerator is thus particularly suitable when it has to be possible to stress or walk upon the hydraulically setting composition again very rapidly after application, for example in road or bridge building, in the prefabrication of concrete elements in precast concrete and reinforced concrete components, or in runway renewals, especially in the case of airstrips. This makes it possible to demold, transport, stack or prestress the precast components after only a few hours, or to travel upon the road surfaces or runways.

Surprisingly, the setting and curing accelerator has been found to be a particularly rapid accelerator compared to known accelerators. In addition, the accelerator has no adverse effect on the processing time or on the final strength of the mortar or concrete produced thereby.

WORKING EXAMPLES

1. Production of the Admixtures

Admixture Z1

5.0 g of a glyceryl 2-monophosphate (for example glyceryl phosphate disodium salt pentahydrate, obtainable from Fluka, Switzerland) were dissolved in 160.0 g of a liquid polycarboxylate ether plasticizer (Sika® ViscoCrete® 20 HE, obtainable from Sika Schweiz AG). 1.6% by weight or 1.65% by weight of this solution, based on the cement, were added to the mortar mixture with the mixing water.

Admixture Z2

0.43 g of a glyceryl 2-monophosphate (for example glyceryl phosphate disodium salt pentahydrate, obtainable from Fluka, Switzerland) and 13.6 g of a liquid polycarboxylate ether plasticizer (Sika® ViscoCrete® 20 HE, obtainable from Sika Schweiz AG) were added to the mortar mixture simultaneously with the mixing water, which corresponds to an amount of plasticizer of 1.6% by weight and an amount of accelerator of 0.05% by weight, based on the cement.

Admixture Z3

19.0 g of glyceryl 1-monooleate (obtainable, for example, from Fluka, Switzerland) were dissolved in 160.0 g of a liquid polycarboxylate ether plasticizer (Sika® ViscoCrete® 20 HE), obtainable from Sika Schweiz AG). 1.6% by weight of this solution, based on the cement, was added to the mortar mixture with the mixing water.

Admixture Z4

1.77 g of an 85% glycerol solution (obtainable, for example, from Fluka, Switzerland) and 6.21 g of a trisodium phosphate (obtainable, for example, from Fluka, Switzerland) were dissolved in 160.0 g of a liquid polycarboxylate ether plasticizer (Sika® ViscoCrete® 20 HE, obtainable from Sika Schweiz AG). 1.68% by weight of this solution, based on the cement, were added to the mortar mixture with the mixing water.

Admixture Z5

1.77 g of an 85% glycerol solution (obtainable, for example, from Fluka, Switzerland) were dissolved in 160.0 g of a liquid polycarboxylate ether plasticizer (Sika® ViscoCrete® 20 HE, obtainable from Sika Schweiz AG). 1.62% by weight of this solution, based on the cement, were added to the mortar mixture with the mixing water.

Admixture Z6

6.21 g of a trisodium phosphate (obtainable, for example, from Fluka, Switzerland) were dissolved in 160.0 g of a liquid polycarboxylate ether plasticizer (Sika® ViscoCrete® 20 HE, obtainable from Sika Schweiz AG). 1.66% by weight of this solution, based on the cement, were added to the mortar mixture with the mixing water.

Admixture Z7

13.6 g of a liquid polycarboxylate plasticizer (Sika® ViscoCrete® 20 HE, obtainable from Sika Schweiz AG) were taken. These were added to the mortar mixture with the mixing water, which corresponds to an amount of 1.6% by weight based on the cement.

Admixture Z8

13.6 g of a liquid polycarboxylate ether plasticizer (Glenium® ACE30, obtainable from BASF Admixtures Deutschland GmbH) were taken. This was added to the mortar mixture with the mixing water, which corresponds to an amount of 1.6% by weight based on the cement.

TABLE 1

Admixture composition in % by weight based on the admixture.

| No. | Accelerator | Plasticizer | Particular details |
|---|---|---|---|
| Z1 | 3% by weight of glyceryl 2-monophosphate | 97% by weight of VC-20HE | Solution |
| Z2 | 3% by weight of glyceryl 2-monophosphate | 97% by weight of VC-20HE | Separate individual components |
| Z3 | 10.6% by weight of glyceryl 1-monooleate | 89.4% by weight of VC-20HE | Solution |
| Z4 | 1.1% by weight of glycerol (85%), 3.7% by weight of trisodium phosphate | 95.2% by weight of VC-20HE | Solution |
| Z5 | 1.1% by weight of glycerol (85%) | 98.9% by weight of VC-20HE | Solution |
| Z6 | 3.7% by weight of trisodium phosphate | 96.3% by weight of VC-20HE | Solution |
| Z7 | — | 100% by weight of VC-20HE | Solution |
| Z8 | Unknown | Glenium® ACE30 | Solution |

1. Mortar Tests

The efficacy of the accelerator or of the admixture comprising the accelerator, and of customary admixtures, was tested in the mortar.

| Composition of the mortar mixture (MM): (maximum grain size 8 mm) | Amount in g |
|---|---|
| Portland cement (Schweizer CEM I 52.5R) | 850 |
| Limestone filler | 141 |
| Sand 0-1 mm | 738 |
| Sand 1-4 mm | 1107 |
| Sand 4-8 mm | 1154 |

The cement used was CEM I 52.5R quick-setting cement with different fineness. The mortar mixture MM1 was produced with quick-setting cement S1, which has a Blaine fineness of 7000 $cm^2/g$. The mortar mixture MM2 was produced with quick-setting cement S2, which has a Blaine fineness of 5000 $cm^2/g$.

The sands, the filler and the cement were mixed dry in a Hobart mixer for 1 minute. Within 30 seconds, the mixing water in which the admixture was dissolved or dispersed was added, followed by mixing for a further 2.5 minutes. The total wet mixing time was 3 minutes. The water/cement ratio (w/c ratio) was 0.4.

To determine the efficacy of the accelerator or of the admixture, the mortar mixtures MM1 and MM2 were admixed with the different admixtures (see Tables 2 and 3). Examples B1 to B6 containing admixtures Z1, Z2 and Z3 are examples, whereas Examples V7 to V12 containing admixtures Z4 to Z8 are comparative examples.

To determine the efficacy of the accelerator or of the admixture, the slump (Table 2) and the compressive strength (Table 3) were determined.

TABLE 2

Slump in mm after 0, 20, 40 and 60 minutes (min).

| No. | Admixture (% by weight) | Mortar mixture | Slump after 0 min | Slump after 20 min | Slump after 40 min | Slump after 60 min |
|---|---|---|---|---|---|---|
| B1 | 1.6% by weight of Z1 | MM1 | 232 | 233 | 193 | 140 |
| B2 | 1.6% by weight of Z1 | MM2 | 250 | 247 | 251 | 213 |
| B3 | 1.65% by weight of Z1 | MM2 | 263 | 242 | 224 | 215 |
| B4 | 1.65% by weight of Z2 | MM1 | 253 | 239 | 216 | 172 |
| B5 | 1.65% by weight of Z2 | MM2 | 258 | 240 | 227 | 223 |
| B6 | 1.6% by weight of Z3 | MM1 | 253 | 220 | 198 | 189 |
| V7 | 1.68% by weight of Z4 | MM2 | 264 | 228 | 212 | 217 |
| V8 | 1.62% by weight of Z5 | MM2 | 261 | 228 | 229 | 224 |
| V9 | 1.66% by weight of Z6 | MM2 | 262 | 232 | 224 | 207 |
| V10 | 1.6% by weight of Z7 | MM2 | 263 | 245 | 237 | 231 |
| V11 | 1.6% by weight of Z8 | MM1 | 264 | 243 | 235 | 212 |
| V12 | 1.6% by weight of Z8 | MM2 | 257 | 235 | 213 | 210 |

The admixture is specified in % by weight based on the cement.

The slump of the mortar was determined to EN 1015-3.

Table 2 shows that the accelerator in the admixture does not adversely affect the slump of the mortar compositions, and the mortar compositions are processable for a comparable period to that with known admixtures without the disclosed accelerator. For the production of precast components in prefabrication or else for road building, the values of the slump after 20 or 40 minutes can, for example, be important. Slump values of more than 220 mm after 20 minutes or more than 190 mm after 40 minutes are excellent values in any case.

For use in road or bridge building, in the prefabrication of concrete elements, in precast concrete and reinforced concrete components or in runway renewals, where the precast components have to be demolded, transported, staked or pre-stressed after only a few hours or the road surfaces or runways have to be traveled upon, however, high strength values after 4 or 6 hours can be of greater significance than a good slump.

The test to determine the compressive strength (in N/mm$^2$) was effected by means of a needle penetrometer (Mecmesin BFG500) and using prisms (40×40×160 mm) after 4 hours, 6 hours and 8 hours (see Table 3).

TABLE 3

Compressive strengths in N/mm$^2$ after 4, 6 and 8 hours (h).

| No. | Admixture (% by weight) | Mortar mixture | After 4 h | After 6 h | After 8 h |
|---|---|---|---|---|---|
| B1 | 1.6% by weight of Z1 | MM1 | 4.9 | 24.1 | 35.2 |
| B2 | 1.6% by weight of Z1 | MM2 | 3.2 | 16.8 | 29.3 |
| B3 | 1.65% by weight of Z1 | MM2 | 3.8 | 21.2 | 34.1 |
| B4 | 1.65% by weight of Z2 | MM1 | 3.2 | 15.6 | 28.9 |
| B5 | 1.65% by weight of Z2 | MM2 | 4.7 | 20.4 | 34.3 |
| B6 | 1.6% by weight of Z3 | MM1 | 1.5 | 13.5 | 26.5 |
| V7 | 1.68% by weight of Z4 | MM2 | 1.7 | 6.3 | 18.6 |
| V8 | 1.62% by weight of Z5 | MM2 | 2.1 | 7.0 | 20.2 |
| V9 | 1.66% by weight of Z6 | MM2 | 1.2 | 4.8 | 14.6 |
| V10 | 1.6% by weight of Z7 | MM2 | 1.9 | 6.4 | 18.1 |
| V11 | 1.6% by weight of Z8 | MM1 | 2.5 | 11.1 | 25.3 |
| V12 | 1.6% by weight of Z8 | MM2 | 2.3 | 9.9 | 24.8 |

Table 3 shows that the mortar compositions to which the admixture Z1, Z2 or Z3 containing the accelerator has been added, either as a solution (Z1, Z3) or as individual components (Z2), have very good early strengths. The strengths are significantly higher after 4 hours (Z1, Z2) and especially after 6 hours (Z1, Z2, Z3) than with known admixtures. Some even have almost double the strength (B1 to B5 containing admixtures Z1 and Z2).

Excellent results were achieved with a glyceryl phosphate and a polycarboxylate ether plasticizer (B1 to B5). If the individual glyceryl and trisodium phosphate components are used separately and not the ester of glycerol and phosphoric acid, the strengths achieved are less good (V7-V9).

With a glyceryl monooleate (B6) too, better strengths were achieved after 6 and after 8 hours than with known admixtures.

Only with plasticizer alone (V10) or with a known admixture (Glenium® ACE 30, which is for example used for quick-setting cement) (V11, V12) were significantly lower strengths achieved.

These results illustrate that, with the disclosed exemplary accelerator, the setting and curing process of the hydraulic binders can be accelerated significantly and excellent early strengths can be achieved without any adverse effect on the processing times, the evolution of strength or the durability of the mortar or concrete compositions produced therewith.

The disclosure is of course not restricted to the working examples shown and described.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An admixture for hydraulically setting systems, comprising:
   at least one accelerator comprising glyceryl phosphate; and
   at least one plasticizer.

2. The admixture as claimed in claim 1, wherein at least some free acid groups of the glyceryl phosphate are neutralized, with a salt of the glyceryl phosphate being an alkali metal salt or a salt of polyvalent cations.

3. The admixture as claimed in claim 1, wherein the plasticizer comprises lignosulfonates, sulfonated naphthalene-formaldehyde condensates, sulfonated melamine-formaldehyde condensates, sulfonated vinyl copolymers, polycarboxylates or mixtures thereof.

4. The admixture as claimed in claim 1, wherein at least some free acid groups of the glyceryl phosphate are neutralized, with a salt of the ester being a sodium, calcium or aluminum salt.

5. The admixture as claimed in claim 1, wherein the at least one plasticizer comprises a polycarboxylate.

6. A binder-containing mixture comprising:
   at least one hydraulically setting binder;
   at least one plasticizer; and
   at least one accelerator in an amount of 0.001 to 10% by weight based on a weight of the hydraulically setting binder, wherein the accelerator comprises glyceryl phosphate.

7. The binder-containing mixture as claimed in claim 6, wherein the at least one plasticizer comprises a polycarboxylate.

8. A process for producing a binder-containing mixture comprising:
   adding an accelerator and a plasticizer as an admixture in solid or liquid form to a hydraulically setting binder, the accelerator comprising glyceryl phosphate.

9. The process of claim 8, comprising:
   accelerating the setting and curing of the hydraulic binder and mortar or concrete produced therefrom.

10. The process as claimed in claim 8, wherein the plasticizer comprises a polycarboxylate.

11. A method for accelerating the setting and curing of a hydraulic binder and mortar or concrete produced therefrom, comprising:
    adding a setting and curing accelerator in an amount of 0.001 to 10% by weight based on a weight of the hydraulic binder, to form a mixture which comprises the hydraulic binder, the accelerator and a plasticizer, wherein the accelerator comprises glyceryl phosphate.

12. The method as claimed in claim 11, wherein the plasticizer comprises a polycarboxylate.

* * * * *